US007486787B2

(12) United States Patent
Hein et al.

(10) Patent No.: US 7,486,787 B2
(45) Date of Patent: *Feb. 3, 2009

(54) SUBSCRIBER LINE INTERFACE CIRCUITRY WITH COMMON BASE AUDIO ISOLATION STAGE

(75) Inventors: Jerrell P. Hein, Driftwood, TX (US); Marius Goldenberg, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/278,405

(22) Filed: Mar. 31, 2006

(65) Prior Publication Data
US 2007/0003052 A1 Jan. 4, 2007

Related U.S. Application Data

(63) Continuation of application No. 09/608,743, filed on Jun. 30, 2000.

(51) Int. Cl.
H04M 9/00 (2006.01)
(52) U.S. Cl. .................................. 379/399.01
(58) Field of Classification Search ............. 379/399.01
See application file for complete search history.

(56) References Cited

U.S. PATENT DOCUMENTS

| 4,151,482 A | 4/1979 | Robe |
| 4,284,958 A | 8/1981 | Pryor et al. |
| 4,609,781 A | 9/1986 | Gay |
| 4,709,388 A | 11/1987 | Defretin |
| 4,827,505 A | 5/1989 | Takato et al. |
| 4,866,767 A | 9/1989 | Tanimoto et al. |
| 4,984,266 A | 1/1991 | Smith |
| 5,175,764 A | 12/1992 | Patel et al. |

(Continued)

FOREIGN PATENT DOCUMENTS

GB 2032730 A 5/1980

OTHER PUBLICATIONS

Advanced Micro Devices, "Am7920: Subscriber Line Interface Circuit Preliminary Datasheet," Publication #19239, Rev. E, Jul. 1998.

(Continued)

*Primary Examiner*—Ramnandan Singh
(74) *Attorney, Agent, or Firm*—Davis & Associates; William D. Davis

(57) ABSTRACT

Methods and apparatus for coupling outgoing analog audio signals to a subscriber line are described. One method includes the step of receiving the outgoing audio signal. The outgoing audio signal is coupled to the subscriber line through a plurality of transistors coupled in a common base configuration. In one embodiment, linefeed driver control signals for controlling battery feed to the subscriber line are received on the same signal lines as the outgoing audio signal. A subscriber line interface circuit apparatus includes a first circuit for coupling a received outgoing audio signal to a subscriber line. The first circuit couples the received outgoing audio signal to the subscriber line through a common base isolation stage. In various embodiments, the common base isolation stage comprises a plurality of bipolar junction transistors coupled in a common base configuration or a plurality of field effect transistors coupled in a common gate configuration.

20 Claims, 5 Drawing Sheets

U.S. PATENT DOCUMENTS

| | | | |
|---|---|---|---|
| 5,182,745 A | | 1/1993 | Heichler |
| 5,274,702 A | * | 12/1993 | Rosch et al. ............ 379/399.01 |
| 5,323,460 A | | 6/1994 | Warner et al. |
| 5,528,682 A | | 6/1996 | Cotreay |
| 5,659,608 A | | 8/1997 | Stiefel |
| 5,721,774 A | | 2/1998 | Stiefel |
| 5,745,563 A | * | 4/1998 | Prentice ................. 379/399.01 |
| 5,828,748 A | | 10/1998 | Akhteruzzaman |
| 5,848,149 A | | 12/1998 | Chen et al. |
| 5,854,550 A | | 12/1998 | Knollman |
| 5,878,133 A | | 3/1999 | Zhou et al. |
| 5,881,129 A | | 3/1999 | Chen et al. |
| 5,926,544 A | | 7/1999 | Zhou |
| 6,178,241 B1 | | 1/2001 | Zhou |
| 6,219,417 B1 | | 4/2001 | Zhou |
| 6,263,015 B1 | | 7/2001 | Awata et al. |
| 6,263,016 B1 | | 7/2001 | Bellenger et al. |
| 6,301,358 B1 | | 10/2001 | Chen et al. |
| 6,615,027 B1 | * | 9/2003 | Sahota et al. .................. 455/91 |
| 6,934,384 B1 | | 8/2005 | Hein |
| 7,180,999 B1 | * | 2/2007 | Hein et al. .................. 379/398 |

OTHER PUBLICATIONS

Advanced Micro Devices, "Am79213/Am79C203/031: Advanced Subscriber Line Interface Circuit (ASLIC™) Device/Advanced Subscriber Line Audio-Processing Circuit (ASLAC™) Device Preliminary Datasheet," Publication #19770, Rev. B, Sep. 1998.

Advanced Micro Devices, "Am79231: Intelligent Subscriber Line Interface Circuit (ISLIC™) Advance Information Datasheet," Publication #22419, Rev. A, Sep. 1998.

Advanced Micro Devices, "Am79Q2241/2242/2243: Quad Intelligent Subscriber Line Audio-Processing Circuit (ISLAC™) Advance Information Datasheet," Publication #22421, Rev. A, Sep. 1998.

Advanced Micro Devices, "Am79R241: Intelligent Subscriber Line Interface Circuit (ISLIC™) Advance Information Datasheet," Publication #22420, Rev. A, Sep. 1998.

Advanced Micro Devices, "Am79R79: Ringing SLIC Device Technical Overview Application Note," Publication #19768, Rev. B, May 1997.

Lucent Technologies, "L8576 Dual Ringing SLIC Preliminary Datasheet," Mar. 1998.

SGS-Thomson Microelectronics, "L3000N/L3030 Subscriber Line Interface Kit Preliminary Data," Jan. 1995.

SGS-Thomson Microelectronics, "L3000S/L3030 Subscriber Line Interface Kit Preliminary Data," Jun. 1997.

SGS-Thomson Microelectronics, "L3037 Subscriber Line Interface Circuit," Dec. 1997.

SGS-Thomson Microelectronics, "SGS-Thomson SLIC AC Models Application Note," 1995.

Goodenough, F., "SLIC Ejects Relays From PABX Line Cards", Electronic Design, vol. 42, No. 14, Jul. 11, 1994, pp. 55-56, 58-59, 62-64, Penton Publishing, Cleveland, Ohio.

* cited by examiner

SUBSCRIBER LINE INTERFACE CIRCUITRY WITH COMMON BASE AUDIO ISOLATION STAGE

CROSS-REFERENCE TO RELATED APPLICATIONS

This application is a continuation of application Ser. No. 09/608,743, filed on Jun. 30, 2000 which is herein incorporated by reference.

FIELD OF THE INVENTION

This invention relates to the field of telecommunications. In particular, this invention is drawn to subscriber line interface circuitry.

BACKGROUND OF THE INVENTION

Subscriber line interface circuits are typically found in the central office exchange of a telecommunications network. A subscriber line interface circuit (SLIC) provides a communications interface between the digital switching network of a central office and an analog subscriber line. The analog subscriber line connects to a subscriber station or telephone instrument at a location remote from the central office exchange.

The analog subscriber line and subscriber equipment form a subscriber loop. The interface requirements of an SLIC result in the need to provide relatively high voltages and currents for control signaling with respect to the subscriber equipment on the subscriber loop. Voiceband communications are low voltage analog signals on the subscriber loop. Thus the SLIC must detect and transform low voltage analog signals into digital data for transmitting communications received from the subscriber equipment to the digital network. For bi-directional communication, the SLIC must also transform digital data received from the digital network into low voltage analog signals for transmission on the subscriber loop to the subscriber equipment. Strict gain and longitudinal balance control are required for subscriber loop applications.

In order to meet the strict requirements, high precision high voltage amplifiers are frequently used for processing voiceband signals. The voiceband output signal may be driven as a voltage through a desired output impedance to the subscriber equipment. Alternatively, the tip and ring lines of the subscriber loop are driven by currents corresponding to the voiceband signal while the desired output impedance is synthesized. Disadvantages of high precision high voltage amplifier solutions include the added cost and board area requirements for the SLIC.

SUMMARY OF THE INVENTION

In view of limitations of known systems and methods, a subscriber line interface circuit is described. A method of coupling an outgoing audio signal to the subscriber line includes the step of receiving the outgoing analog audio signal. The outgoing analog audio signal corresponds to a transformed digital audio signal originating from a digital switching network. The method includes the step of coupling the outgoing audio signal to the subscriber line through a plurality of transistors coupled in a common base configuration. In one embodiment, the method includes the step of receiving linefeed driver control signals on the same signal lines as the outgoing audio signal. The linefeed driver control signals control battery feed to the subscriber line.

In one embodiment, a subscriber line interface circuit apparatus includes a first circuit for coupling a received outgoing audio signal to a subscriber line. The first circuit couples the received outgoing audio signal to the subscriber line through a common base isolation stage. In various embodiments, the common base isolation stage comprises a plurality of bipolar junction transistors coupled in a common base configuration or a plurality of field effect transistors coupled in a common gate configuration.

In one embodiment a subscriber line interface circuit includes a signal processor and a linefeed driver coupled to receive an outgoing audio signal from the signal processor. The linefeed driver couples the outgoing audio signal to the subscriber line through a common base isolation stage. In one embodiment, the common base isolation stage comprises a plurality of bipolar junction transistors coupled in a common base configuration. In an alternative embodiment, the common base isolation stage comprises a plurality of field effect transistors coupled in a common gate configuration. In various embodiments, the signal processor provides linefeed control signals to the linefeed driver on the same signal lines as the outgoing audio signals. The linefeed control signals control battery feed to the subscriber line.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
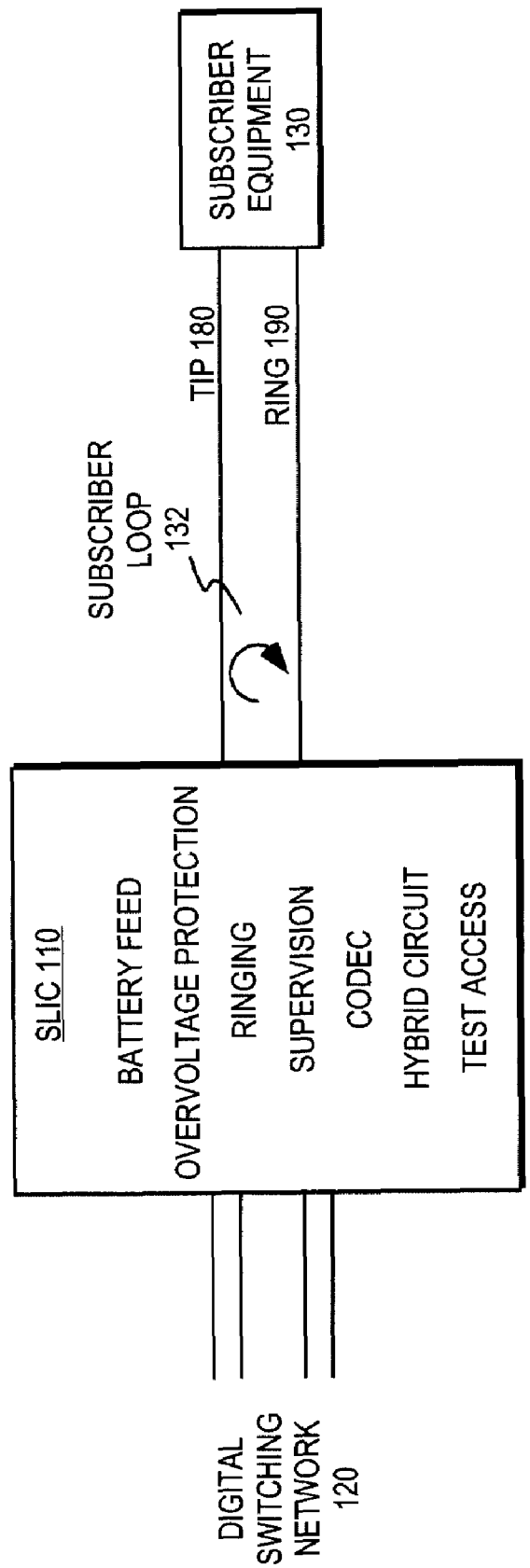
FIG. 1 illustrates one embodiment of a central office exchange including a subscriber line interface circuit (SLIC) coupling subscriber equipment to a digital switching system.

FIG. 1 illustrates functional elements of one embodiment of a subscriber line interface circuit (SLIC) 110 typically associated with plain old telephone services (POTS) telephone lines. The subscriber line interface circuit (SLIC) provides an interface between a digital switching network 120 of a local telephone company central exchange and a subscriber loop 132 including subscriber equipment 130.

The subscriber loop 132 is typically used for communicating analog data signals (e.g., voiceband communications) as well as subscriber loop "handshaking" or control signals. The analog data signals are typically on the order of 1 volt peak-to-peak (i.e., "small signal"). The subscriber loop control signals typically consist of a 48 VDC offset and an AC signal of 40-140 Vrms (i.e., "large signal"). The subscriber loop state is often specified in terms of the tip 180 and ring 190 portions of the subscriber loop.

The SLIC is expected to perform a number of functions often collectively referred to as the BORSCHT requirements. BORSCHT is an acronym for "battery feed," "overvoltage protection," "ring," "supervision," "codec," "hybrid," and "test."

Recent transformerless SLIC designs tend to distribute the functional requirements between two integrated circuits based on whether the functions are traditionally associated with the high voltage subscriber loop controls or the low voltage data processing. For example, in one embodiment, the codec is implemented in a low voltage integrated circuit and the remaining functions (e.g., supervision) are implemented primarily in a high voltage integrated circuit such as a bipolar integrated circuit. Although this design tends to offer considerable space, weight, and power efficiencies over designs requiring passive inductive components, this distribution of the functional requirements tends to result in a relatively expensive high voltage integrated circuit.

Figure 2:
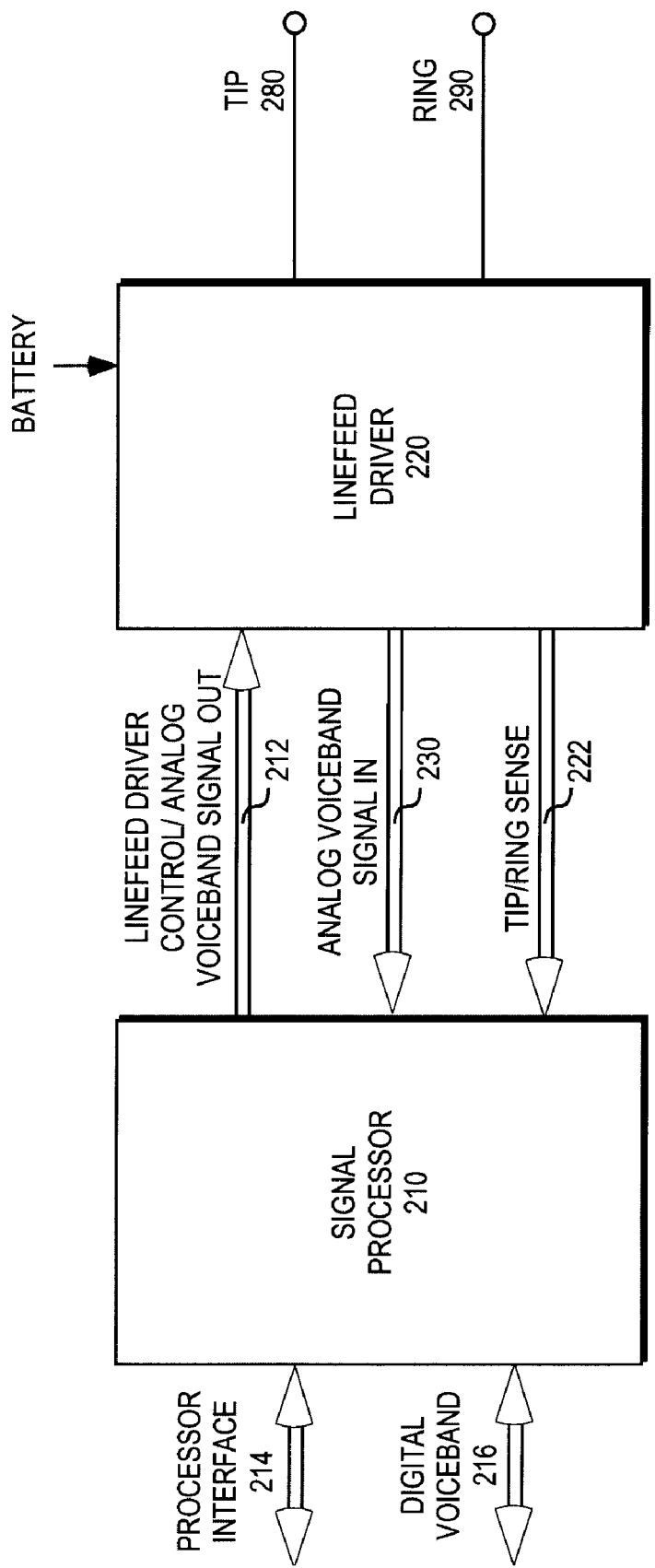
FIG. 2 illustrates a block diagram of an SLIC including a signal processor and a linefeed driver.

FIG. 2 illustrates one embodiment of a SLIC wherein the BORSCHT functions are distributed between a signal processor 210 and a linefeed driver 220. Signal processor 210 is responsible for at least the ring control, supervision, codec, and hybrid functions. Signal processor 210 controls and interprets the large signal subscriber loop control signals as well as handling the small signal analog voiceband signals and the digital voiceband data. In one embodiment, the signal processor 210 is an integrated circuit.

In one embodiment, the signal processor includes a processor interface 214 to enable programmatic control of the signal processor 210. The processor interface effectively enables programmatic or dynamic control of battery control, battery feed state control, voiceband signal amplification and level shifting, longitudinal balance, ringing currents, and other subscriber loop control parameters as well as setting thresholds such as a ring trip detection thresholds and an off-hook detection threshold.

Signal processor 210 includes a codec for bi-directional transformation of the voiceband communications between the digital and analog domains as is well known in the art. The digital voiceband data is received from the digital switching network on interface 216. Within the signal processor, the digital voiceband data is coupled to a digital codec interface. An analog codec interface provides outgoing analog voiceband signals to the linefeed driver. The analog codec interface also receives incoming analog voiceband signals from the linefeed driver. The terms "incoming" and "outgoing" used in reference to the voiceband (i.e., audio) signal refer to the intended data flow from the perspective of the digital switching network. Thus, incoming voiceband signals received from the subscriber line are transformed from analog to digital form and provided to the digital switching network. Outgoing voiceband signals from the digital switching network are transformed from digital to analog form and provided to the subscriber line for use by the subscriber equipment.

Signal processor 210 receives subscriber line state information from linefeed driver 220 as indicated by tip/ring sense 222. This information is used to generate control signals for linefeed driver 220 as indicated by linefeed driver control 212. In one embodiment, the linefeed driver control and outgoing analog voiceband signals are communicated on the same signal lines 212. Incoming analog voiceband signals are received by the signal processor on line 230.

Linefeed driver 220 maintains responsibility for battery feed to tip 280 and ring 290. Overvoltage protection is not explicitly illustrated, however, overvoltage protection can be provided by fuses incorporated into linefeed driver 220, if desired. Linefeed driver 220 includes sense circuitry to provide signal processor 210 with pre-determined sensed subscriber loop operating parameters as indicated by tip/ring sense 222. Signal processor 210 performs any necessary processing on the sensed parameters in order to determine the operational state of the subscriber loop. For example, differences or sums of sensed voltages and currents are performed as necessary by signal processor 210 rather than linefeed driver 220. Thus common mode and differential mode components (e.g., voltage and current) of the subscriber loop are calculated by the signal processor rather than the linefeed driver.

Linefeed driver 220 modifies the large signal tip and ring operating conditions in response to linefeed driver control 212 provided by signal processor 210. This arrangement enables the signal processor to perform processing as needed to handle the majority of the BORSCHT functions. For example, the supervisory functions of ring trip, ground key, and off-hook detection can be determined by signal processor 210 based on operating parameters provided by tip/ring sense 222.

Figure 3A:
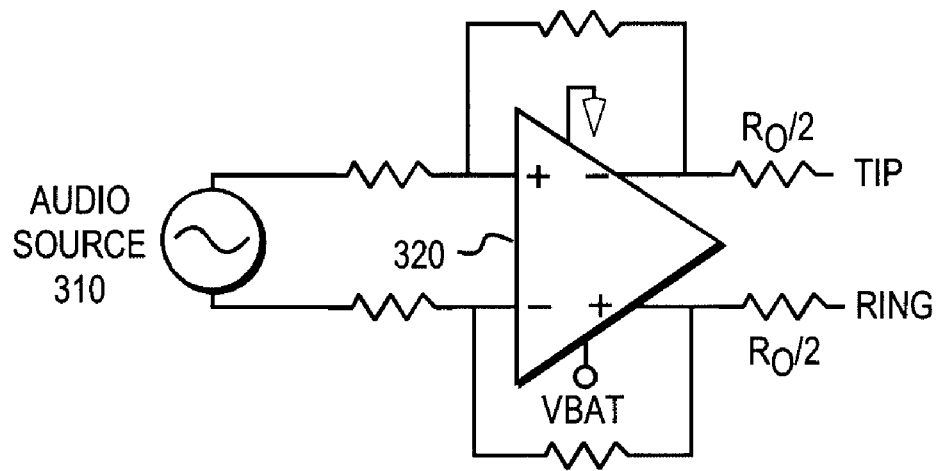
FIG. 3A illustrates a circuit for driving an outgoing audio signal as a voltage through an output impedance.
Figure 3B:
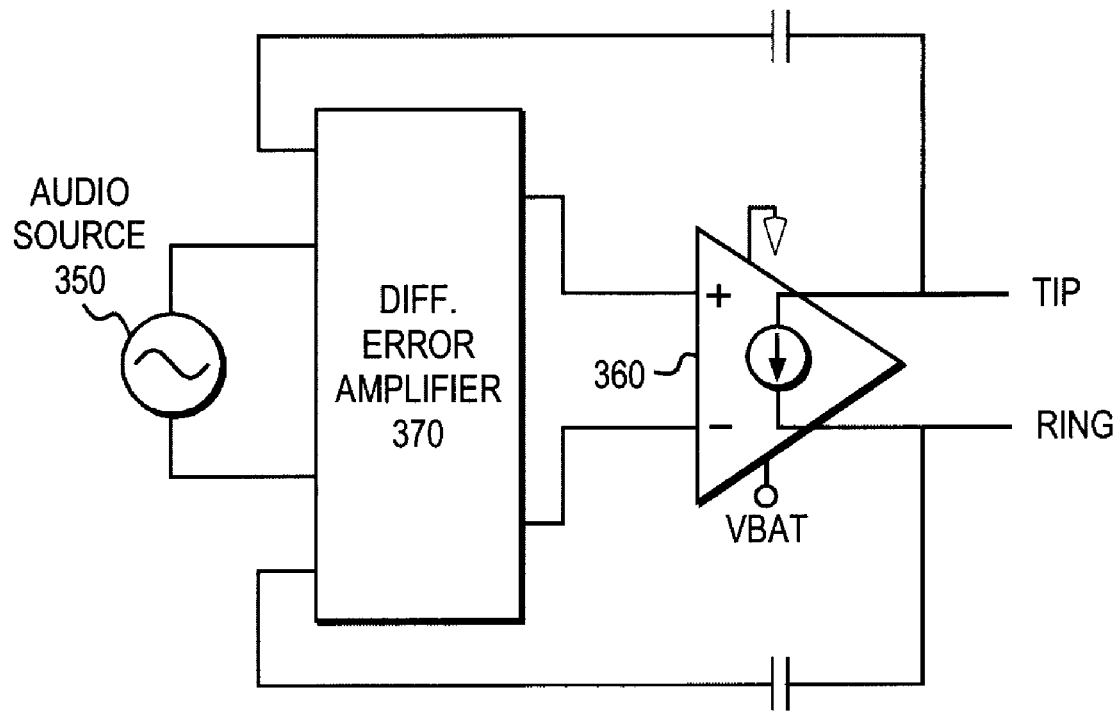
FIG. 3B illustrates a circuit for driving the audio output signal as a current through a synthesized output impedance.

Due to strict gain control and longitudinal balance requirements, a precise means of coupling voiceband signals to tip and ring is necessary. FIG. 3A illustrates one embodiment of the a.c. signal components associated with the high precision high voltage amplifier providing the outgoing voiceband (i.e., audio) signal to tip and ring. The outgoing audio signal modeled as audio source 310 is driven as a voltage through a desired output impedance $R_O$ using precision high voltage amplifier 320. FIG. 3B illustrates an alternate approach. An outgoing audio signal 350 is driven as a current through a synthesized output impedance using precision high voltage transconductance amplifier 360 and differential error amplifier 370. The precision amplifiers are typically part of a high voltage integrated circuit which has disadvantages in terms of cost and board area required for implementation.

Figure 4:
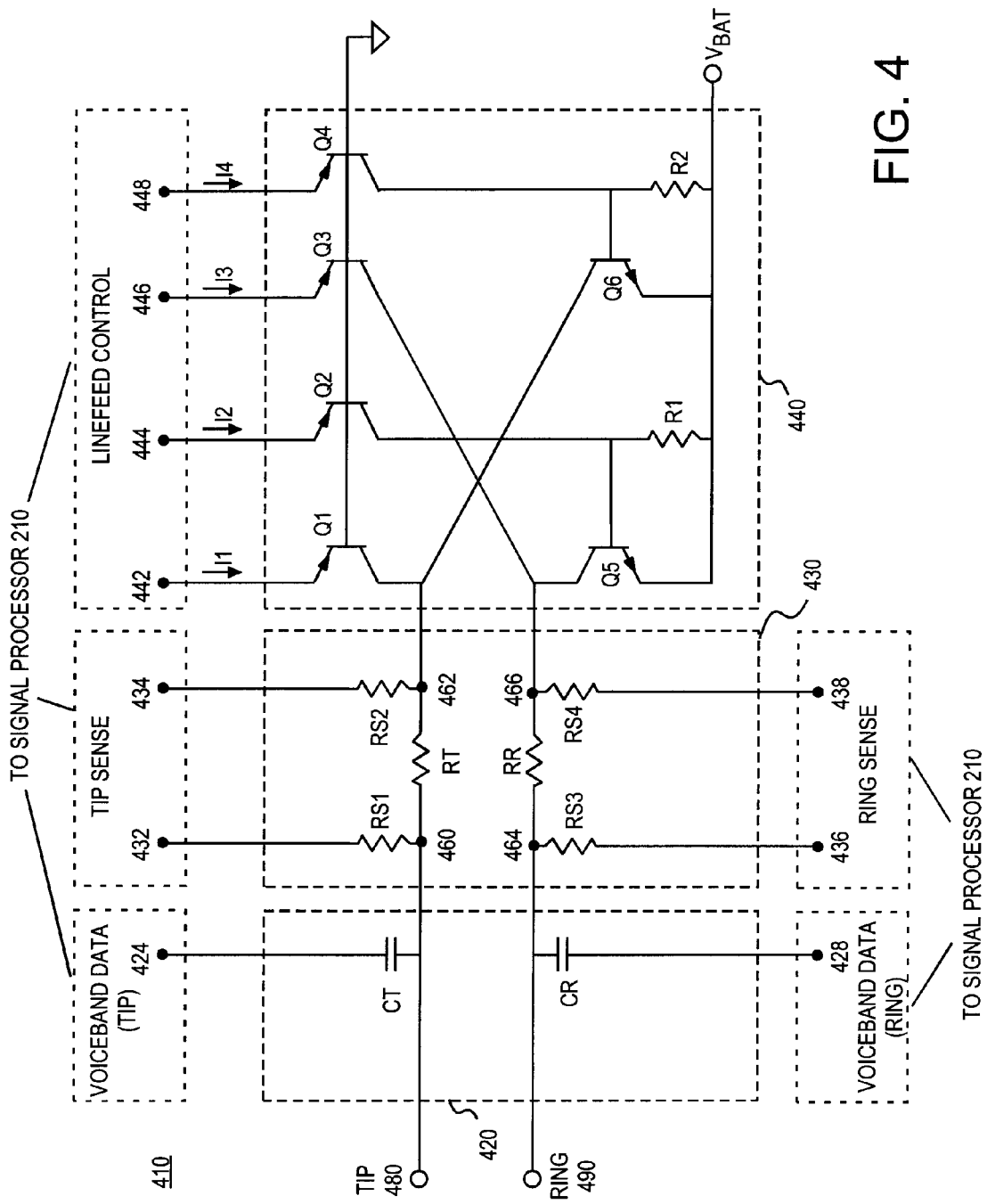
FIG. 4 illustrates one embodiment of a linefeed driver circuit.

FIG. 4 illustrates one embodiment of a SLIC linefeed driver 410. In one embodiment, the linefeed driver 410 is implemented as a number of discrete components. Linefeed driver 410 includes a voiceband sensing circuitry 420, line sensing circuitry 430, and power circuitry 440.

Voiceband circuitry 420 enables signals corresponding to voiceband communications to be retrieved from the subscriber loop. Nodes 424 and 428 serve to communicate voiceband signals from the subscriber loop to signal processor 210 (i.e., "incoming audio"). Capacitors CR and CT effectively provide AC coupling for the incoming audio signal from the subscriber loop to the signal processor while decoupling signal processor 210 from the DC offsets of the tip 480 and ring 490 nodes. Thus capacitors CR and CT effectively provide DC isolation of the incoming analog audio interface formed by nodes 424 and 428 from the subscriber loop. In the embodiment illustrated, voiceband circuitry 420 provides AC coupling of the incoming analog audio signal between the subscriber loop and the signal processor using only passive components.

Line sensing circuitry 430 enables signal processor 210 to determine the tip 480 and ring 490 node voltages as well as the subscriber loop current using sensing resistors RS1, RS2, RS3, and RS4. Resistors RT and RR are used to generate a voltage drop for determining the tip and ring currents. In one embodiment, line sensing circuitry 430 consists only of passive discrete components.

Referring to FIG. 2, tip/ring sense 222 includes a sensed tip signal and a sensed ring signal. In one embodiment, the sensed tip signal includes first and second sensed tip voltages. Resistors RS1 and RS2 are used to sense the tip line voltage at each end of RT. Resistors RS1 and RS2 convert the sensed tip line voltages to currents suitable for handling by signal processor 210 at nodes 432 and 434. The difference between the first and second sensed tip voltages is proportional to the tip current. Likewise, the sensed ring signal includes first and second sensed ring voltages. Resistors RS3 and RS4 similarly convert sensed ring line voltages at both ends of RR to currents suitable for handling by signal processor 210 at nodes 436 and 438. The difference between the first and second sensed ring voltages is proportional to the ring current. These calculations, however, can be performed as necessary by the signal processor 210 rather than the linefeed driver 220 circuitry. In addition, these sensed parameters enable the signal processor 210 to determine the subscriber loop voltage and the subscriber loop common mode and differential mode currents.

Power circuitry 440 provides the battery feed and other relatively high voltage functions to the subscriber loop in accordance with analog linefeed control signals provided by the signal processor 210 at nodes 442, 444, 446, and 448. Processing of the sensed parameters of the tip and ring lines for generating the linefeed control signals is handled exclusively by signal processor 210.

The subscriber loop current and the tip and ring voltages are controlled by transistors Q1-Q6. In one embodiment, Q1-Q4 are PNP bipolar junction transistors and Q5-Q6 are NPN bipolar junction transistors. Given that the base terminals of Q1-Q4 are coupled to ground, nodes 442-448 need only be approximately 0.7 volts to turn on transistors Q1-Q4. Due to the small voltage drop between the base and emitters of Q1-Q4, control of the linefeed circuitry requires relatively low power and thus linefeed driver control currents I1-I4 may be provided by a signal processor 210 implemented as a low voltage complementary metal oxide semiconductor (CMOS) integrated circuit.

Transistors Q1, Q4, and Q6 (and resistor R2) control the tip voltage 480. The tip voltage is increased by the application of control current I1 to Q1. The tip voltage (node 480) is decreased by the application of control current I4 to Q4. Thus control currents I1 and I4 effectively provide a tip control signal for manipulating the tip voltage at node 480.

Similarly, transistors Q2, Q3, and Q5 (and resistor R1) control the ring voltage 490. The application of control current I3 to Q3 increases the ring voltage. The ring voltage is decreased by the application of control current I2 to Q2. Control currents I2 and I3 effectively provide a ring control signal for manipulating the ring voltage at node 490.

Control currents I1-I4 thus effectively control the large signal subscriber loop current and tip and ring voltages. For example, the ringing signal can be generated by using the control signals at nodes 442-448 to periodically reverse the polarity of tip 480 with respect to ring 490 (i.e., battery polarity reversal) at the nominal ringing frequency.

Line sensing portion 430 enables signal processor 210 to determine the large signal state of the subscriber loop without the need for intervening active circuitry or level shifters. In one embodiment, line sensing portion 430 comprises only passive discrete components. The linefeed control inputs 442-448 enable signal processor 210 to actively manage the large signal state of the subscriber loop. In particular, the large signal AC and DC components of the subscriber loop control protocol can now be controlled directly by a low voltage integrated circuit. The large signal AC and DC control loops are effectively terminated at the signal processor 210.

In other words, the large signal AC and DC control loops are terminated at the low voltage integrated circuit. Thus signal processing and state determination such as off-hook, ring trip, and ring control formerly associated with high power analog circuitry can be handled predominately by a low voltage integrated circuit. In addition, the integrated circuit signal processor can handle processing of the small signal analog voiceband signals from the subscriber loop without the need for intervening active elements or level shifting circuitry.

In one embodiment, the outgoing analog audio signal is superimposed on the control currents I1 and I3 for power circuitry 440. Thus the audio signal and the linefeed control signals are provided on the same signal lines to the linefeed driver circuitry. The outgoing audio signal is communicated using nodes 442 and 446. One advantage of this configuration is that the termination impedance can be set by controlling currents I1 and I3. The use of a programmable signal processor effectively places the value of the termination impedance under programmatic control.

Figures 5A, 5B:
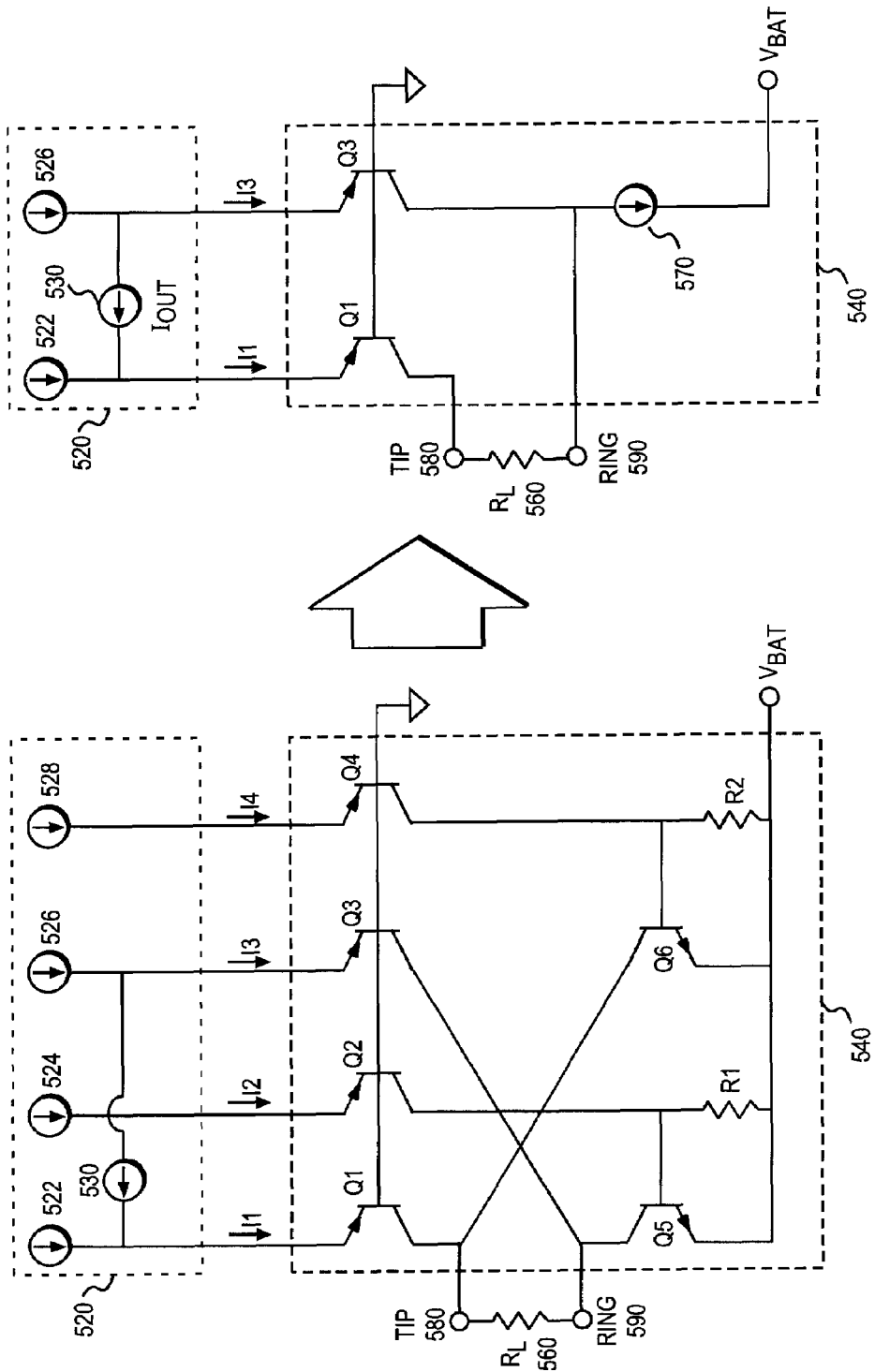
FIG. 5A illustrates the signal processor linefeed control providing an outgoing audio signal to a power circuitry portion of the linefeed driver circuitry.
FIG. 5B illustrates a simplified model of transmission of the outgoing audio signal from the linefeed control portion of the signal processor onto the tip and ring nodes of the subscriber line through a common base isolation stage.

FIG. 5A illustrates the linefeed control 520 portion of the signal processor 210 and the power circuitry 540 of the linefeed driver 410. Linefeed control 520 includes current sources 522, 524, 526, and 528 within the signal processor. The large signal components of currents I1-I4 are controlled by linefeed control 520. Transistors Q1 and Q3 receive the outgoing audio signal from the audio signal current source 530. Audio signal current source 530 provides a current ($I_{OUT}$) corresponding to the outgoing analog audio signal received from the codec. The outgoing analog audio signal originated as a digital audio signal from the digital network before being transformed by the codec.

During normal operation, a selected one of transistors Q5 and Q6 is "on." Resistor $R_L$ 560 represents the subscriber line impedance load. When transistor Q5 is on, Q2, Q5, and R1 effectively form a DC current source. Alternatively, when transistor Q6 is on, Q4, Q6, and R2 effectively form a DC current source. FIG. 5B illustrates a model of FIG. 5A when transistor Q5 is on (normal battery feed). Q2, Q5, and R1 are modeled as DC current source 570. Current sources 522 and 526 are also large signal and thus DC current sources.

Transistors Q1 and Q3 are coupled in a common base configuration. Transistors Q1 and Q3 couple the outgoing audio signal received from the signal processor. The common base isolation stage effectively isolates the signal processor from the DC offset of the tip 580 and ring 590 nodes. Audio current source 530 ($I_{OUT}$) manipulates I1 and I3 to put the outgoing audio signal onto the tip 580 and ring 590 nodes.

A DC bias current is established in Q1 and Q3 with non-precision low voltage and high voltage circuitry. The DC bias does not directly affect the audio gain or balance and thus high precision is not required. Subscriber line impedance synthesis can be accomplished by providing sensed tip and ring voltages as feedback for the outgoing audio current source 530.

The gain through the common base stage is the average α (i.e., $\alpha_{AVG}$) of Q1 and Q2. For typical transistor betas (β), α approaches 1.0. Thus there is approximately unity gain between $I_{OUT}$ and the AC component of the current in $R_L$ corresponding to the outgoing audio signal. $I_{OUT}$ can be increased to accommodate lower transistor gains to maintain a fixed audio amplitude on tip and ring.

For example, if each of transistors Q1 and Q3 has a β between 100 and 200, the geometric mean of α is calculated as follows:

$$\alpha = \frac{\beta}{\beta+1}$$

$$\alpha_{mean} = \sqrt{\alpha_1 \alpha_2} = \sqrt{\left(\frac{100}{101}\right)\left(\frac{200}{201}\right)} = 0.993$$

Current source 530 can be increased by $$\frac{1}{0.993} = 1.007$$

in order to give a net gain of 1.0. The worst case gain variation would be calculated as follows:

$$\varepsilon = \pm 20\ \log\left(\frac{\alpha_{min}}{\alpha_{max}}\right) = 20\ \log\left(\frac{0.990}{0.993}\right) = \pm 0.03\ db$$

Thus the worst case gain variation is well within allowable gain variation requirements for subscriber line applications (±0.15 to ±0.50 db).

The balance requirement is a measure of the balance between the gains to tip and ring, respectively. This result is calculated as follows:

$$\text{balance} = 20\ \log\left(\frac{\alpha_1 - \alpha_2}{\alpha_{mean}}\right) - 6.7\ db$$

For the example presented above, substitution of the values into the equation for balance yields:

$$\text{balance} = \left(\frac{0.995 - 0.990}{0.993}\right) - 6.7$$
$$= -53\ db$$

Greater gain and balance control can be achieved through the use of transistors with higher or better matched betas. Alternatively, other configurations such as Darlington pairs can be used to achieve a greater β. Different types of transistors such as metal oxide semiconductor or junction field effect transistors (i.e., MOSFET or JFET) can be used. The term "common base" includes "common gate" equivalents for MOSFET and JFET transistors. Thus a "common base isolation stage" is intended to include field effect transistors coupled in a common gate configuration.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
   a) coupling one or more linefeed driver control signals for controlling battery feed to a subscriber line through a plurality of transistors coupled in a common base configuration; and
   b) superimposing an outgoing audio signal on at least one of the control signals to communicate the outgoing audio signal through the same plurality of transistors.

2. The method of claim 1 further comprising the step of:
   c) manipulating the control signals to set a termination impedance.

3. The method of claim 1 wherein the plurality of transistors comprises bipolar junction transistors.

4. The method of claim 1 further comprising:
   c) sensing a tip and a ring voltage of the subscriber line; and
   d) providing the sensed tip and ring voltages as feedback to a source of the outgoing audio signal to accomplish subscriber line impedance synthesis.

5. A method comprising the steps of:
   a) receiving an outgoing audio signal and at least one linefeed driver control signal on a same signal line; and
   b) providing the outgoing audio signal to a subscriber line through a common base isolation stage.

6. The method of claim 5 further comprising the step of:
   c) controlling a battery feed to a tip node and a ring node of the subscriber line in accordance with any linefeed driver control signal received by the common base isolation stage.

7. The method of claim 5 wherein the common base isolation stage comprises a plurality of bipolar junction transistors coupled in a common base configuration.

8. The method of claim 5 wherein the outgoing audio signal and the at least one linefeed driver control signal are communicated as currents on the same signal line.

9. A subscriber line interface circuit apparatus, comprising:
   a first circuit for coupling a received outgoing audio signal to a subscriber line, wherein the first circuit couples the received outgoing audio signal to the subscriber line through a common base isolation stage, wherein the first circuit controls battery feed to the subscriber line in accordance with received linefeed driver control signals, wherein the outgoing audio signal is carried by one or more signal lines carrying the linefeed driver control signals.

10. The apparatus of claim 9 wherein the first circuit comprises a plurality of bipolar junction transistors coupled in a common base configuration.

11. The apparatus of claim 9 wherein the linefeed driver control signals and the outgoing audio signal are received from a same integrated circuit.

12. The apparatus of claim 9 wherein the first circuit comprises:
   a tip control circuit, wherein the tip control circuit increases a tip node voltage in response to a first tip control signal, wherein the tip control circuit decreases a tip node voltage in response to a second tip control signal; and
   a ring control circuit wherein the ring control circuit increases a ring node voltage in response to a first ring control signal, wherein the ring control circuit decreases a ring node voltage in response to a second ring control signal.

13. The linefeed driver of claim 12 wherein the tip control circuit comprises:
   a first transistor of a first type having an emitter coupled to receive the first tip control signal;
   a second transistor of the first type having an emitter coupled to receive the second tip control signal, wherein a base of each of the first and second transistors is coupled to a first node as a signal ground;
   a third transistor of a second type having a collector coupled to a collector of the first transistor and an emitter coupled to a second node;
   a resistor having a first end coupled to the second node, a second end of the resistor coupled to a base of the third transistor and a collector of the second transistor.

14. The subscriber line linefeed driver of claim 13 wherein the first type is a PNP bipolar junction transistor, wherein the second type is an NPN bipolar junction transistor.

15. A subscriber line interface circuit apparatus, comprising:
- a signal processor providing an outgoing audio signal, the signal processor sensing a tip voltage and a ring voltage of the subscriber line; and
- a linefeed driver coupled to receive the outgoing audio signal and at least one linefeed driver control signal on the same signal line, wherein the linefeed driver couples the received outgoing audio signal to a subscriber line through a common base isolation stage, wherein the linefeed driver provides battery feed to the subscriber line in accordance with the linefeed driver control signal.

16. The apparatus of claim 15 wherein the common base isolation stage comprises a plurality of bipolar junction transistors coupled in a common base configuration.

17. The apparatus of claim 15 wherein the signal processor is a complementary metal oxide semiconductor (CMOS) integrated circuit.

18. The linefeed driver of claim 15 wherein the linefeed driver comprises:
- a tip control circuit, wherein the tip control circuit increases a tip node voltage in response to a first tip control signal, wherein the tip control circuit decreases a tip node voltage in response to a second tip control signal; and
- a ring control circuit wherein the ring control circuit increases a ring node voltage in response to a first ring control signal, wherein the ring control circuit decreases a ring node voltage in response to a second ring control signal, wherein the signal processor provides the first and second tip control signals and the first and second ring control signals.

19. The linefeed driver of claim 18 wherein the tip control circuit comprises:
- a first transistor of a first type having an emitter coupled to receive the first tip control signal;
- a second transistor of the first type having an emitter coupled to receive the second tip control signal, wherein a base of each of the first and second transistors is coupled to a first node as a signal ground;
- a third transistor of a second type having a collector coupled to a collector of the first transistor and an emitter coupled to a second node; and
- a resistor having a first end coupled to the second node, a second end of the resistor coupled to a base of the third transistor and a collector of the second transistor.

20. The linefeed driver of claim 19 wherein the first type is a PNP bipolar junction transistor, wherein the second type is an NPN bipolar junction transistor.

* * * * *